(12) United States Patent
Mukherjee et al.

(10) Patent No.: US 9,746,332 B2
(45) Date of Patent: Aug. 29, 2017

(54) METHOD AND SYSTEM FOR SCHEDULING VEHICLES ALONG ROUTES IN A TRANSPORTATION SYSTEM

(71) Applicant: XEROX CORPORATION, Norwalk, CT (US)

(72) Inventors: Koyel Mukherjee, Bangalore (IN); Ankit Kumar, Mumbai (IN); Pallavi Manohar, Thane (IN); Narayanan Unny Edakunni, Bangalore (IN); Sharmistha Jat, Pune (IN)

(73) Assignee: Conduent Business Services, LLC, Dallas, TX (US)

( * ) Notice: Subject to any disclaimer, the term of this patent is extended or adjusted under 35 U.S.C. 154(b) by 77 days.

(21) Appl. No.: 14/837,070

(22) Filed: Aug. 27, 2015

(65) Prior Publication Data

US 2017/0059334 A1    Mar. 2, 2017

(51) Int. Cl.
*G01C 21/34* (2006.01)
*G06Q 10/04* (2012.01)
*G08G 1/01* (2006.01)

(52) U.S. Cl.
CPC .......... *G01C 21/34* (2013.01); *G01C 21/3453* (2013.01); *G01C 21/343* (2013.01);
(Continued)

(58) Field of Classification Search
CPC .............. G01C 21/3492; G01C 21/34; G01C 21/3466; G01C 21/3446; G01C 21/343;
(Continued)

(56) References Cited

U.S. PATENT DOCUMENTS 4,360,875 A     11/1982  Behnke
6,314,361 B1 *  11/2001  Yu .......................... G06Q 10/02
                                                    701/117
(Continued)

FOREIGN PATENT DOCUMENTS

WO    WO 2009065637 A1    5/2009

OTHER PUBLICATIONS

Prabhat Shrivastava and Margaret OMahony. A model for development of optimized feeder routes and coordinated schedulesa genetic algorithms approach. Transport policy, 13(5):413{425, 2006.
Maged Dessouky, Mansour Rahimi, and Merrill Weidner. Jointly optimizing cost, service, and environmental performance in demand-responsive transit scheduling. Transportation Research Part D: Transport and Environment, 8(6):433{465, 2003.
PJ Gundaliya, Prabhat Shrivastava, and PL Dhingra. Model for simultaneous routing and scheduling using genetic alghoritm. Trasporti Europei, 2000.
(Continued)

*Primary Examiner* — Dale Moyer
(74) *Attorney, Agent, or Firm* — Jones Robb PLLC

(57) ABSTRACT

The disclosed embodiments illustrate methods and systems for scheduling one or more first vehicles along a route in a transportation system. The method includes determining one or more demands pertaining to a commutation along a route, where the route comprises at least one pair of stations such that there is a unique path between the pair of stations. The method further includes determining a set of constraints associated with the transportation system. The set of constraints are based on at least a count of second vehicles plying on one or more routes in the transportation system at a time instance, a capacity of a first vehicle, and a performance metric of the transportation system. Further, the method includes determining a count of first vehicles, for plying along the route at the time instance, based on at least the set of constraints.

20 Claims, 7 Drawing Sheets

(52) U.S. Cl.
CPC ....... *G01C 21/3446* (2013.01); *G06Q 10/047* (2013.01); *G08G 1/0129* (2013.01)

(58) Field of Classification Search
CPC .. G01C 21/3453; G06Q 10/04; G06Q 10/047; G08G 1/0129
See application file for complete search history.

(56) References Cited

U.S. PATENT DOCUMENTS

| | | | |
|---|---|---|---|
| 8,572,001 | B2 | 10/2013 | Hollis |
| 2006/0224423 | A1 | 10/2006 | Sun et al. |
| 2008/0059273 | A1* | 3/2008 | Miller .................... G06Q 10/04 705/7.31 |
| 2009/0254405 | A1* | 10/2009 | Hollis .............. G06Q 10/06315 705/7.25 |
| 2013/0024249 | A1 | 1/2013 | Zohar et al. |
| 2013/0159206 | A1 | 6/2013 | Barahona et al. |

OTHER PUBLICATIONS

C. Fleurent. Software tools for transit scheduling and routing at giro. http://tram.mcgill.ca/Teaching/seminar/presentations/GIRO_charles.pdf. Accessed: Oct. 30, 2014.
U.S. Appl. No. 14/687,035, filed Apr. 15, 2015; Method and System for Recommending One or More Vehicles for One or More Requestors; Jat et al.

* cited by examiner

METHOD AND SYSTEM FOR SCHEDULING VEHICLES ALONG ROUTES IN A TRANSPORTATION SYSTEM

TECHNICAL FIELD

The presently disclosed embodiments are related, in general, to a transportation system. More particularly, the presently disclosed embodiments are related to methods and systems for scheduling one or more first vehicles along routes in the transportation system.

BACKGROUND

Transport agencies may want to schedule vehicles on routes in such a manner that public demands along these routes are met. Usually, the transport agencies may determine the schedule of vehicles manually.

The public demand may vary based on various parameters such as time of a day, a public meeting, or a festival. Considering all such parameters to schedule the vehicles on the routes, manually, may be a non-trivial job. Therefore, there is a need for a robust method and system to manage the routes and further schedule the vehicles along these routes.

SUMMARY

According to embodiments illustrated herein, there is provided a method for scheduling one or more first vehicles along a route in a transportation system. The method includes determining, by one or more processors, one or more demands pertaining to a commutation along the route, wherein the route comprises at least one pair of stations such that there is a unique path between the pair of stations. The method further includes determining, by the one or more processors, a set of constraints associated with the transportation system. The determination of the set of constraints comprises at least a determination of whether a count of second vehicles, plying on one or more routes in the transportation system at a time instance, is less than a count of total vehicles, a determination of whether a capacity of a first vehicle is at least less than a count of the one or more demands, and a determination of whether a performance metric of the transportation system meets a predefined threshold. The method further includes determining, by the one or more processors, a count of first vehicles, for plying along the route at the time instance, based on at least the set of constraints.

According to embodiments illustrated herein, there is provided a system for scheduling one or more first vehicles along a route in a transportation system. The system includes one or more processors configured to determine one or more demands pertaining to a commutation along the route, wherein the route comprises at least one pair of stations such that there is a unique path between the pair of stations. The one or more processors are further configured to determine a set of constraints associated with the transportation system. The determination of the set of constraints comprises at least a determination of whether a count of second vehicles, plying on one or more routes in the transportation system at a time instance, is less than a count of total vehicles, a determination of whether a capacity of a first vehicle is at least less than a count of the one or more demands, and a determination of whether a performance metric of the transportation system meets a predefined threshold. The one or more processors are further configured to determine a count of first vehicles, for plying along the route at the time instance, based on at least the set of constraints.

According to embodiments illustrated herein, there is provided a computer program product for use with a computing device. The computer program product comprises a non-transitory computer readable medium storing a computer program code for scheduling one or more first vehicles along a route in a transportation system. The computer program code is executable by one or more processors in the computing device to determine one or more demands pertaining to a commutation along the route, wherein the route comprises at least one pair of stations such that there is a unique path between the pair of stations. The computer program code is further executable by the one or more processors to determine a set of constraints associated with the transportation system. The determination of the set of constraints comprises at least a determination of whether a count of second vehicles, plying on one or more routes in the transportation system at a time instance, is less than a count of total vehicles, a determination of whether a capacity of a first vehicle is at least less than a count of the one or more demands, and a determination of whether a performance metric of the transportation system meets a predefined threshold. The computer program code is further executable by the one or more processors to determine a count of first vehicles, for plying along the route at the time instance, based on at least the set of constraints. The computer program code is further executable by the one or more processors to transmit information to a computing device in the first vehicle, wherein the information is indicative of at least the plying of the first vehicle along the route at the time instance.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
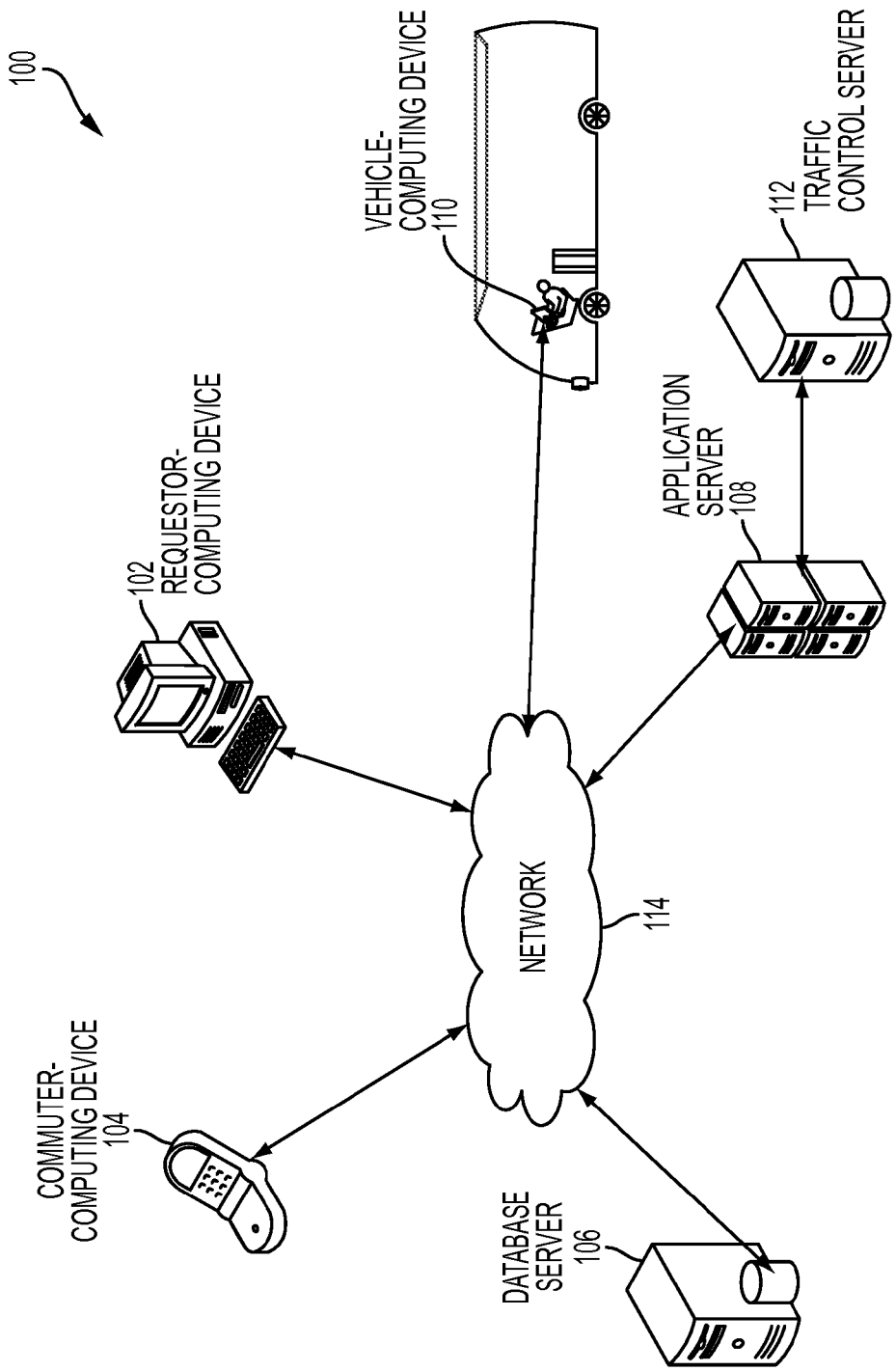
FIG. 1 is a block diagram of a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a device that includes one or more processors/microcontrollers and/or any other electronic components, a device, or a system that performs one or more operations according to one or more programming instructions/codes. Examples of the computing device may include, but are not limited to, a desktop computer, a laptop, a personal digital assistant (PDA), a mobile device, a Smartphone, a tablet computer (e.g., iPad® and Samsung Galaxy Tab®), and the like.

A "transportation system" refers to a transportation network that comprises one or more vehicles that may ply along one or more routes. In an embodiment, the transportation network may keep a track of demands on the one or more routes. Further, the transportation network may keep a track or monitor traffic on the one or more routes. In an embodiment, the transportation system may have further responsibility of managing/maintaining the infrastructure on the one or more routes. In an embodiment, the transportation system may correspond to a public transportation system, a freight logistic system, a commercial shared ride services system, and a private transportation system.

A "vehicle" refers to means of transportation that may transport one or more individuals and/or cargos between two or more locations along a route. In an embodiment, a group of one or more individuals may share the vehicle. In an embodiment, the vehicle may correspond to one or more of, but not limited to, a bus, a truck, a car, a ship, an airplane, and the like.

A "count of total vehicles" refers to a number of vehicles possessed or controlled by a transportation agency in a transportation system. For example, a transportation agency has 200 buses. This implies that the count of total vehicles is 200.

A "count of second vehicles" refers to a number of vehicles that are currently running along one or more routes. For example, a transportation agency has 200 buses. Out of 200 vehicles, 115 vehicles are currently running along one or more routes, implying that the count of second vehicles is 115.

A "count of first vehicles" refers to a number of vehicles that are currently inactive (i.e., currently not operating) but may be scheduled to operate in future. For example, a transportation agency has 200 buses. Out of 200 vehicles, 115 vehicles are currently running along one or more routes. Thus, 85 buses are inactive, implying that the count of first vehicles is 85.

A "route" refers to a path that may be traversed by a vehicle to pick up or drop one or more individuals along the route. In an embodiment, the route may include a set of "s" stations in a predetermined order. In an embodiment, the route may include at least one pair of stations having at least one source station and one destination station. For example, a city bus travels from Harlem to East Village in New York. The city bus travels through $4^{th}$ Avenue, Madison Avenue, and $5^{th}$ Avenue. Thus, the path from Harlem to East Village is a route with Harlem being a source station and East Village being a destination station.

A "schedule" refers to a plan for carrying out an activity or an event at a predefined time instance. In an embodiment, the scheduling of a vehicle along a route may correspond to a predefined time duration during which the vehicle may traverse along the route. In another embodiment, the schedule may also refer to a time instance at which a vehicle has to start from a source station or has to reach a destination station. For example, a city bus is schedule to travel along a route (e.g., Harlem to East Village) at each of one or more time instances such as 9:00 AM, 9:30 AM, 10:00 AM, and so on.

A "commuter" refers to an individual who may wish to avail a transport facility to commute between a pair of stations along a route. In an embodiment, the commuter may send a travel request using a computing device associated with him/her. In an embodiment, the commuter may pay some incentives in exchange of the transportation facility. Hereinafter, "commuter", "traveler", "rider", "requestor", or "passenger" may be interchangeably used.

A "demand" refers to a request that may be initiated by one or more individuals corresponding to a travel between a pair of stations along a route. In an embodiment, the demand may be determined based on at least a historical demand, a pre-booked demand, or a real-time demand. Hereinafter, "demand", "need", "request", or "requirement" may be interchangeably used.

A "unique path" refers to a directed path, such that a vehicle may follow the directed path between a pair of stations. For example, there are two paths (e.g., a first path and a second path such that the first path is shorter than the second path) for traveling between a source station and a destination station. There are 10 demands along the first path and eight demands along the second path. However, a vehicle may take at least 30 minutes to travel along the first path and 15 minutes to travel along the second path. Further, the vehicle may be required to reach the destination in at most 20 minutes. In such a case, the vehicle may be scheduled to travel along the second path. Thus, the second path is the unique path for the vehicle. In another embodiment, the unique path may be selected based on at least a demand on a path. For example, there are two paths (e.g., a first path and a second path) for traveling between a source station and a destination station. There are 70 demands along the first path and 30 demands along the second path. However, a vehicle may take at least 30 minutes to travel along the first path and 15 minutes to travel along the second path. Further, the vehicle may be required to reach the destination in at most 20 minutes. However, the revenue, which may be earned by scheduling the vehicle to travel along the first path is much more than the second path. In such a case, the vehicle may be scheduled to travel along the first path. Thus, the first path is the unique path for the vehicle.

A "capacity of a vehicle" refers to a maximum number of individuals that may be accommodated in a vehicle when the vehicle is empty. In an embodiment, the capacity of the vehicle corresponds to a maximum number of permissible vacancies in the vehicle. Thus, the capacity of the vehicle may correspond to a total number of seats in the vehicle. For example, a city bus can accommodate 45 commuters. This implies that the capacity of the city bus is 45.

A "passenger kilometer index (PKI)" refers to a performance metric, which measures a number of commuters served per unit of distance traveled.

A "revenue kilometer index (RKI)" refers to a performance metric, which measures a total revenue earned per kilometer traveled.

A "tolerance time" refers to a time duration up to which an individual (e.g., a commuter) may wait for a vehicle at a station for travel between a pair of stations along a route. For example, Jack requested for a bus for a travel from a first station to a second station along a first route at 10:30 AM. Jack further specified that he will wait for the bus till 10:40 AM. In such a case, 10 minutes is the tolerance time associated with Jack.

A "fare" refers to an amount or a sum, which may be charged to a commuter corresponding to a commutation between a pair of stations along a route on a vehicle. In an embodiment, the fare may be charged, when an individual is traveling along the route or a cargo is transported from one location to another location along the route. For example, a first commuter boarded a bus from a first station. The first commuter wishes to travel up to a second station. The first commuter is asked by a crew of the bus to pay USD 5 for the travel from the first station to the second station. In such a case, USD 5 is the fare of the bus for travelling from the first station to the second station. Hereinafter, "fare", "tariff", "fee", or "charge" may be interchangeably used.

FIG. 1 is a block diagram of a system environment 100 in which various embodiments may be implemented. The system environment 100 includes a transport manager-computing device 102, a commuter-computing device 104, a database server 106, an application server 108, a vehicle-computing device 110, and a network 114. Further, the application server 108 may be communicatively coupled with a traffic control server 112. Various devices in the system environment 100 may be interconnected over the network 114. FIG. 1 shows, for simplicity, one transport manager-computing device 102, one commuter-computing device 104, one database server 106, one application server 108, and one vehicle-computing device 110. However, it will be apparent to a person having ordinary skill in the art that the disclosed embodiments may also be implemented using multiple transport manager-computing devices, multiple commuter-computing devices, multiple database servers, multiple application servers, and multiple vehicle-commuting devices without departing from the scope of the disclosure.

The transport manager-computing device 102 refers to a computing device including one or more processors and one or more memories. The one or more memories may include computer readable codes and instructions that may be executable by the one or more processors to perform predetermined operations. In an embodiment, the transport manager-computing device 102 may be utilized by a user such as an employee of a transportation agency (e.g., a public or a private transportation system) operating/managing one or more vehicles on one or more routes. The one or more vehicles may correspond to total vehicles possessed by the transportation agency. In an embodiment, the user may utilize the transport manager-computing device 102 to input information pertaining to the one or more vehicles associated with the transportation agency. For example, information pertaining to one or more vehicles may comprise a count of total vehicles, a count of vehicles which are currently in operations, a capacity of each vehicle, expected revenue, a fare scheme, and so on. In an embodiment, the transport-manager computing device 102 may transmit the information pertaining to the one or more vehicles to the database server 106 or the application server 108. In an embodiment, the user may further utilize the transport manager-computing device 102 to provide one or more inputs. For example, one or more inputs may corresponding to, a determination of one or more demands along one or more routes, a selection of a set of routes from the one or more routes, a confirmation or a rejection of the one or more demands, and a transmission of information pertaining to the one or more demands or the set of routes to the application server 108.

In an embodiment, the user may utilize a graphical user interface (GUI) on the transport manager-computing device 102 to view/edit a schedule of the one or more vehicles at one or more time instances along the one or more routes. Further, the user of the transport manager-computing device 102 may utilize the schedule to prepare a travel roster and manage various travel related logistics. For example, the user may coordinate with one or more crews of each of one or more vehicles and may inform them about a schedule associated with each of the one or more vehicles.

The transport manager-computing device 102 may correspond to a variety of computing devices such as, but not limited to, a laptop, a PDA, a tablet computer, a Smartphone, a phablet, and the like.

The commuter-computing device 104 refers to a computing device including one or more processors and one or more memories. The one or more memories may include computer readable codes and instructions that may be executable by the one or more processors to perform predetermined operations. In an embodiment, the commuter-computing device 104 may be utilized by a requestor (e.g., a commuter, a traveler, or a passenger) who may wish to avail a transport facility to commute between at least one pair of stations along a route. The commuter may utilize a GUI on the commuter-computing device 104 to provide information pertaining to his/her travel schedule along a route. For example, information pertaining to a travel may comprise at least one or more of, but not limited to, a source station, a destination station, a time instance at which a commuter may expect a vehicle at the source station, and a tolerance time up to which the commuter may wait for the vehicle at the source station. The commuter-computing device 104 may transmit the information pertaining to the travel provided by the commuter as a travel request (i.e., a demand) to the transport manager-computing device 102, the database server 106, and/or the application server 108 over the network 114. Further, in an embodiment, the commuter may utilize the commuter-computing device 104 to cancel or edit a pending travel request. In an embodiment, the commuter-computing device 104 may receive a notification message pertaining to the travel request from the transport manager-computing device 102 and/or the application server 108 over the network 114. The notification message may be indicative of at least a confirmation or a rejection of the travel request and/or a detail of the vehicle which may have been scheduled along the route in response to the travel request.

The commuter-computing device 104 may correspond to a variety of computing devices such as, but not limited to, a laptop, a PDA, a tablet computer, a Smartphone, a Phablet, and the like.

A person having ordinary skill in the art will understand that the scope of the disclosure is not limited to the utilization of the commuter-computing device 104 by a single commuter. In an embodiment, the commuter-computing device 104 may be utilized by more than one commuters to raise one or more travel requests.

The database server 106 may refer to a computing device that may be communicatively coupled over the network 114. The database server 106 may store at least the one or more travel requests received from the commuter-computing device 104. The one or more travel requests (i.e., one or more demands) may correspond to pre-booked demands or real-time demands, which may have been raised by one or more commuters. The pre-booked demands may correspond to the one or more demands, which may have been requested in advance (i.e., at least before a first predefined time period prior to a date of travel) by the one or more commuters. For example, a first commuter raises a travel request at 5:00 PM on May 19, 2015. The travel request may correspond to a travel from a first station to a second station along a first route at 10:30 AM on May 20, 2015. In such a case, the travel request may correspond to a pre-booked demand. The real-time demands may correspond to the one or more demands, which may have been requested in advance (i.e., at least before a second predefined time period prior to the date of travel) by the one or more commuters. For example, a second commuter raises a travel request at 9:00 AM on May 20, 2015. The travel request may correspond to a travel from a second station to a third station along a first route at 10:45 AM on May 20, 2015. In such a case, the travel request may correspond to a real-time demand.

Further, in an embodiment, the database server 106 may store a historical demand of the one or more commuters. In an embodiment, the historical demand may comprise demands of the one or more commuters, which may have been addressed/dealt in the past. For example, a historical demand associated with a first commuter may comprise information such as a travel pattern associated with the first commuter and a frequency and a time of travel between one or more pairs of stations. The historical demand may further comprise a log of time instances at which the one or more commuters may have travelled in the past. The log of time instances may be indicative of at least a sign-in and a sign-out associated with each of the one or more commuters. In an embodiment, the log of time instances may be extracted from databases of one or more electronic ticketing systems or other transportation agencies.

Further, the database server 106 may store information associated with the one or more routes. For example, information associated with a route may include a source station and a destination station of the route, one or more substations between the source station and the destination station, an expected (or real-time) traffic congestion on the route at one or more time instances of a day, a fare charged for traveling between a pair of stations, and an expected cost of operating a vehicle along the route. Further, the database server 106 may store information associated with the one or more vehicles. For example, information associated with one or more vehicles may comprise a count of the one or more vehicles and a capacity of the one or more vehicles. Further, the database server 106 may store salary details of one or more crews associated with each of the one or more vehicles.

Further, in an embodiment, the database server 106 may be configured to transmit or receive one or more instructions/queries/information to/from one or more devices, such as the transport manager-computing device 102 and the application server 108 over the network 114. In an embodiment, the database server 106 may receive a query from the application server 108 to retrieve the historical demand, the pre-book demands, the real-time demands, and the information associated with the one or more routes/vehicles. For querying the database server 106, one or more querying languages may be utilized such as, but are not limited to, SQL, QUEL, DMX and so forth. Further, the database server 106 may be realized through various technologies such as, but not limited to, Microsoft® SQL server, Oracle, and My SQL.

The application server 108 may refer to a computing device or a software framework that may provide a generalized approach to create the application-server implementation. In an embodiment, the functionalities of the application server 108 may be dedicated to the efficient execution of procedures such as, but not limited to, programs, routines, or scripts stored in the one or more memories for supporting its applied applications. In an embodiment, the application server 108 may receive or extract the information associated with the one or more vehicles or the one or more routes. In an embodiment, the application server 108 may receive an input from the transport manager-computing device 102. Thereafter, the application server 108 may send the query to the database server 106 to extract the historical demand, the real-time demands, or the pre-book demands. The application server 108 may determine the one or more demands along the one or more routes at the one or more time instances based on at least one or more of the historical demand, the real-time demands, and the pre-book demands. The determination of the one or more demands has been explained later in conjunction with FIG. 1, FIG. 2, and FIG. 3.

Thereafter, the application server 108 may determine a set of constraints associated with the transportation agency. The application server 108 may utilize an Integer Learning Programming (ILP) technique or a Greedy algorithm technique to determine a count of first vehicles, which may be scheduled to ply/travel along one or more routes. The determination of the count of first vehicles has been explained later in conjunction with FIG. 1, FIG. 2, and FIG. 3. Thereafter, the application server 108 may display the scheduling of each of the first vehicles on the GUI of the transport manager-computing device 102. Further, in an embodiment, the application server 108 may transmit information pertaining to the scheduling of each of the first vehicles to the vehicle-computing device 110 associated with each of the first vehicles.

The application server 108 may be realized through various types of application servers such as, but not limited to, Java application server, .NET framework application server, and Base4 application server.

A person having ordinary skill in the art will understand that the scope of the disclosure is not limited to the database server 106 as a separate entity. In an embodiment, the functionalities of the database server 106 can be integrated into the application server 108.

A person having ordinary skill in the art will further appreciate that the scope of the disclosure is not limited to the application server 108 and the transport manager-computing device 102 as separate entities. In an embodiment, the application server 108 may be realized as an application hosted on or running on the transport manager-computing device 102 without departing from the spirit of the disclosure.

The vehicle-computing device 110 refers to a computing device including one or more processors and one or more memories. The one or more memories may include computer readable codes and instructions that maybe executable by the one or more processors to perform predetermined operations. In an embodiment, each of the one or more vehicles may include the vehicle-computing device 110. In an embodiment, the vehicle-computing device 110 may include a navigation device with inbuilt GPS sensors. Further, the one or more memories of the vehicle-computing device 110 may store information pertaining to a map of a geographical area in which the vehicle plies. In an embodiment, the vehicle-computing device 110 may present the map of the geographical area with the predefined route on which the vehicle plies. In addition, in an embodiment, the vehicle-computing device 110 may display the notification message. The notification message may correspond to at least the scheduling of each of the one or more first vehicles. In an embodiment, an operator of a first vehicle may utilize the vehicle-computing device 110 to view the notification message and thereafter either accepts or reject the transmitted scheduled. Examples of the operator may include, but are not limited to, an individual driving a vehicle, an individual navigating the vehicle, or an individual coordinating a route of the vehicle. An example of a graphical user-interface displaying the notification message of the scheduling to the first vehicles has been explained in conjunction with FIG. 4D.

The vehicle-computing device 110 may correspond to a variety of computing devices such as, but not limited to, a laptop, a PDA, a tablet computer, a Smartphone, a phablet, and the like.

The network 114 corresponds to a medium through which content and messages flow between various devices of the system environment 100 (e.g., the application server 108, the database server 106, the transport manager-computing device 102, the commuter-computing device 104, and the vehicle-computing device 110). Examples of the network 114 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 114 in accordance with various wired and wireless communication protocols such as Transmission Control Protocol and Internet Protocol (TCP/IP), User Datagram Protocol (UDP), and 2G, 3G, or 4G communication protocols.

Figure 2:
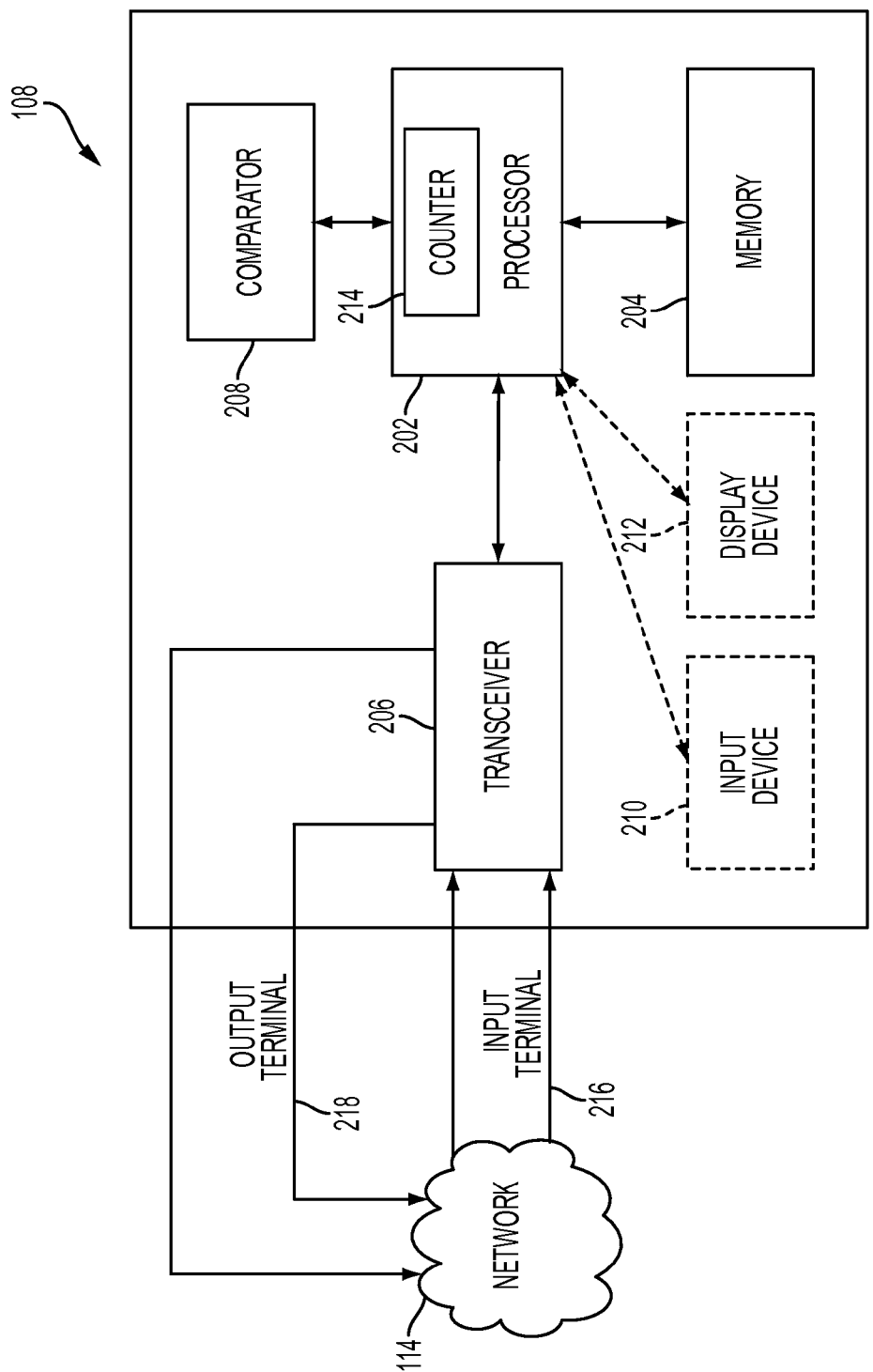
FIG. 2 is a block diagram that illustrates a system for scheduling first vehicles along a set of routes in a transportation system, in accordance with at least one embodiment.

FIG. 2 is a block diagram that illustrates a system 108 for scheduling the one or more first vehicles along the set of routes in the transportation system, in accordance with at least one embodiment. In an embodiment, the system 108 may correspond to the application server 108, the transport manager-computing device 102, or the vehicle-computing device 110. For the purpose of ongoing description, the system 108 is considered as the application server 108. However, the scope of the disclosure should not be limited to the system 108 as the application server 108. The system 200 may also be realized as the transport manager-computing device 102 or the vehicle-computing device 110, without departing from the spirit of the disclosure.

The system 108 includes one or more processors, such as a processor 202, one or more memories, such as a memory 204, one or more transceiver, such as a transceiver 206, one or more comparators, such as a comparator 208, one or more input devices, such as an input device 210, and one or more display devices, such as a display device 212. The transceiver 206 is connected to the network 114 through the input terminal 216 and the output terminal 218.

The processor 202 may be configured to execute one or more sets of instructions stored in the memory 204. The processor 202 is coupled to the memory 204, the transceiver 206, the comparator 208, the input device 210, the display device 212, and the counter 214. The processor 202 may further comprise an arithmetic logic unit (not shown) and a control unit (not shown). The arithmetic logic unit (ALU) may be coupled to the control unit. The ALU may be configured to perform one or more mathematical and logical operations and the control unit may control the operation of the ALU. Further, the processor 202 may comprise one or more counters such as a counter 214. The counter 214 may be utilized to determine the count of the one or more vehicles. Though, the counter 214 is implemented within the processor 202 in FIG. 2, a person skilled in the art will appreciate the counter 214 to be implemented as independent from the processor 202 without departing from the scope of the disclosure. The processor 202 may execute a set of instructions/programs/codes/scripts stored in the memory 204 to perform the one or more operations. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions. In an embodiment, the memory 204 may include one or more buffers (not shown). The one or more buffers may store at least one or more of, but not limited to, the historical demands, the real-time demands, the pre-book demands, the information associated with the one or more routes, the information associated with the set of constraints, and the information associated with the one or more vehicles. Some of the commonly known memory implementations include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more instructions stored in the memory 204 may enable the hardware of the system 108 to perform the predetermined operations.

The transceiver 206 may be operable to communicate with the one or more devices, such as the transport manager-computing device 102, the commuter-computing device 104, and the vehicle-computing device 110 and/or one or more servers, such as the database server 106 or the traffic control server 112 over the network 114. The transceiver 206 receives and transmits the demands associated with the one or more routes and the information associated with the one or more vehicles or the one or more routes from/to various components of the system environment 100 (e.g., the database server 106, the transport manager-computing device 102, the commuter-computing device 104, and the vehicle-computing device 110) over the network 114 through the input terminal 216 and the output terminal 218. Examples of the transceiver 206 may include, but are not limited to, an antenna, an Ethernet port, a USB port, or any other port that can be configured to receive and transmit data. The transceiver 206 receives and transmits the demands/content/information/notification messages in accordance with the various communication protocols, such as, TCP/IP, UDP, and 2G, 3G, or 4G communication protocols through the input terminal 216 and the output terminal 218, respectively.

The comparator 208 is configured to compare at least two input signals to generate an output signal. In an embodiment, the output signal may correspond to either "1" or "0." In an embodiment, the comparator 208 may generate output "1" if the value of a first signal (from the at least two signals) is greater than the value of a second signal (from the at least two signals). Similarly, the comparator 208 may generate an output "0" if the value of the first signal is less than the value of the second signal. In an embodiment, the comparator 208 may be realized through either software technologies or hardware technologies known in the art. Though, the comparator 208 is depicted as independent from the processor 202 in FIG. 1, a person skilled in the art will appreciate that the comparator 208 may be implemented within the processor 202 without departing from the scope of the disclosure.

The input device 210 may comprise suitable logic, circuitry, interfaces, and/or code that may be operable to receive one or more inputs from the user. The input device 210 may be operable to communicate with the processor 202. Examples of the input devices may include, but are not limited to, a touch screen, a keyboard, a mouse, a joystick, a microphone, a camera, a motion sensor, a light sensor, and/or a docking station.

The display device 212 may comprise suitable logic, circuitry, interfaces, and/or code that may be operable to render a display. In an embodiment, the display device 212 may be realized through several known technologies such as, Cathode Ray Tube (CRT) based display, Liquid Crystal Display (LCD), Light Emitting Diode (LED) based display, Organic LED display technology, and Retina display technology. In addition, in an embodiment, the display device 212 may be capable of receiving the one or more inputs from the user. In such a scenario, the display device 212 may be a touch screen that enables the user to provide the one or more inputs. In an embodiment, the touch screen may correspond to at least one of a resistive touch screen, capacitive touch screen, or a thermal touch screen. In an embodiment, the display device 212 may receive input through a virtual keypad, a stylus, a gesture, and/or touch based input.

Figure 3:
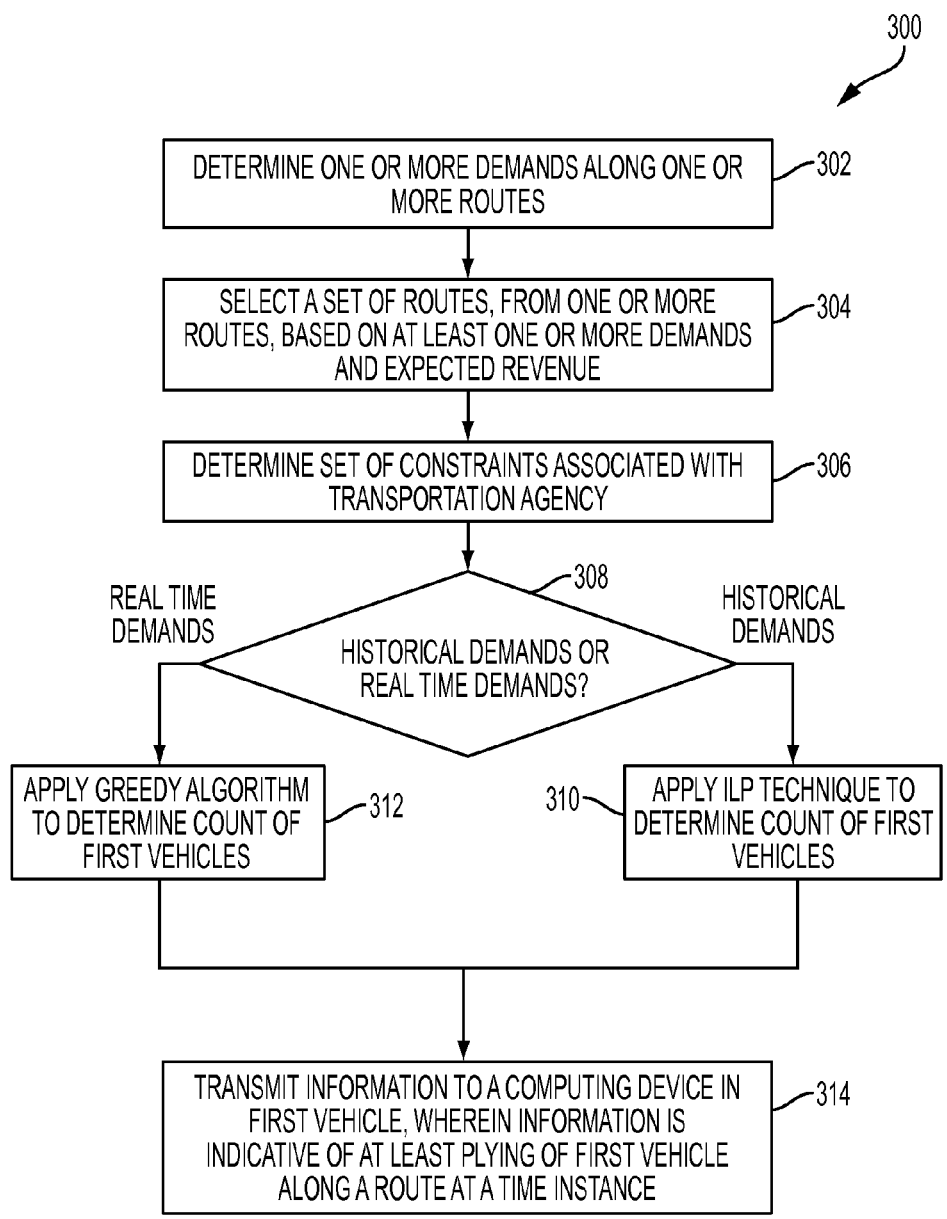
FIG. 3 depict a flowchart illustrating a method for scheduling first vehicles along a set of routes in a transportation system, in accordance with at least one embodiment.

An embodiment of the operation of the system 108 for scheduling the one or more first vehicles along the set of routes has been explained further in conjunction with FIG. 3.

FIG. 3 is a flowchart illustrating a method for scheduling the one or more first vehicles along the set of routes in the transportation system, in accordance with at least one embodiment. The flowchart 300 has been described in conjunction with FIG. 1 and FIG. 2.

At step 302, the one or more demands along the one or more routes are determined. In an embodiment, the processor 202 may be configured to determine the one or more demands for the one or more routes. The one or more demands may correspond to the one or more travel requests by the one or more commuters between at least one pair of stations along the one or more routes. Prior to determining the one or more demands, the processor 202 may receive the input from the user of the transport manager-computing device 102. The input may correspond to the one or more demands on the one or more routes. The input may further be indicative of whether the one or more demands shall be determined either based on the historical demands, the pre-booked demands, the real-time demands, or a combination of at least two demands.

In case the one or more demands correspond to at least the historical demands, the processor 202 may extract the historical demands from the database server 106. In another embodiment, the processor 202 may extract the historical demands from databases of other transportation agencies, which keeps a record of the demands associated with each commuter. The historical demands may comprise a log of the demands of the one or more commuters, which may have been addressed in the past. For example, the historical demands may include at least a count of commuters, who may have boarded a vehicle for travel between one or more pairs of stations at one or more time instances. The processor 202 may determine/predict a travel pattern or a demand between the one or more pairs of stations at the one or more time instances based on at least the count of commuters traveling between the one or more pairs of stations. For example, 50 individuals board a vehicle from a first station at 9:30 AM to travel up to a second station on every weekday. In such a case, the processor 202 may determine that the demand between the first station and the second station at 9:30 AM on every weekday is 50.

Further, the historical demands may comprise the log of the time instances at which the one or more commuters may have traveled in the past. For example, a commuter may have utilized an electronic ticket to travel between a pair of stations in the past. In such a case, the historical demands may indicate about the sign-in time and the sign-out time associated with the commuter. Further, the processor 202 may utilize the sign-in time and the sign-out time of the commuter over a predefined time period to determine the travel pattern or the demand associated with the commuter. For example, the processor 202 draws, from an electronic ticket associated with the commuter, that the commuter boards a vehicle at 5:00 PM from the first station and get down from the vehicle at 5:30 PM at the second station. The processor 202 further determines that the commuter follows this travel pattern on every weekend. In such a case, the processor 202 may consider this travel pattern as one demand between the first station and the second station. Similarly, the processor 202 may determine the one or more demands between the one or more pairs of stations along the one or more routes.

Further, the historical demands may comprise the log of the demands associated with a public holiday or a festival. For example, the processor 202 draws from the historical demand associated with a festival such as Good Friday that 1000 commuters had traveled along a first route between 9:00 AM to 10:00 AM on Apr. 18, 2014. In such a case, the processor 202 may determine or predict that the demand along the first route may be at least 1000 on Apr. 3, 2015

(Good Friday). Similarly, the processor 202 may determine or predict the demands along the one or more routes for each festival or public holiday.

In case the one or more demands correspond to at least the pre-booked demands, the processor 202 may extract the pre-booked demands from the database server 106. The pre-book demands may correspond to the one or more demands for the one or more vehicles, which may have been booked in advance by the one or more commuters to travel between the one or more pairs of stations. Further, the processor 202 may utilize the pre-booked demands to determine the one or more demands between the one or more pairs of stations associated with the one or more routes. For example, the processor 202 receives 150 pre-book demands. Thereafter, the processor 202 determines one or more demands for one or more routes at one or more time instances based on at least a source station, a destination station, and a boarding time associated with each pre-book demand. For example, out of 150 pre-booked demands, the processor 202 determines that 45 pre-booked demands correspond to a first route at 10:45 AM, 50 pre-books demands correspond to a second route at 12:05 PM, and 55 pre-book demands correspond to a third route at 5:00 PM.

In case the one or more demands correspond to at least the real-time demands, the processor 202 may receive the real-time demands from the transport manager-computing device 102 or the commuter-computing device 104. After receiving the real-time demands, the processor 202 may determine the one or more routes associated with the real-time demands. For example, the processor 202 receives a real-time demand from a first commuter at 12:00 PM on May 21, 2015. The real-time demand corresponds to a travel at 1:35 PM on May 21, 2015 from a first station to a second station. The processor 202 determines that the first station and the second station lie along a first route. In such a case, the processor 202 may include the real-time demand of the first commuter as one demand for travel between the first station and the second station along the first route. Similarly, the processor 202 may determine the one or more demands based on at least the received real-time demands from the one or more commuters.

In an embodiment, the one or more demands (determined based on the pre-booked demands or the real-time demands) may be associated with the tolerance time. The tolerance time associated with each demand may be indicative of the time duration up to which each commuter may further wait for the vehicle on the source station, after expiration of a requested time associated with each demand. In case the vehicle fails to reach the source station at the schedule time and the tolerance time is further elapsed, the commuter may board another vehicle of his/her choice. After determining the one or more demands for the one or more routes, the processor 202 may be configured to determine the set of routes.

At step 304, the set of routes is selected from the one or more routes. In an embodiment, the processor 202 may select the set of routes from the one or more routes. Prior to the selection of the set of routes, the processor 202 may extract the traffic information. The traffic information may correspond to at least the traffic congestion on each of the one or more routes at the one or more time instances of the day. In an embodiment, the processor 202 may extract the traffic information along the one or more routes from the traffic control server 112. In another embodiment, the processor 202 may extract the traffic information by utilizing one or more web services, which provide real time traffic information. For example, the processor 202 may utilize Google Map to extract traffic information along a route.

Further, in an embodiment, the processor 202 may obtain the fare, which may be charged to each commuter for the travel between each pair of stations along the one or more routes, from the transport manager-computing device 102. In case the processor 202 does not receive the fare from the transport manager-computing device 102, the processor 202 may utilize one or more predefined fares stored in the memory 204. In an embodiment, the fare may be a flat fare (i.e., a fixed fare), which is independent of at least the one or more routes, a distance traveled, or a time of travel in a day. For example, a transportation agency operates a vehicle along a first route. The first route includes four sub-stations including a source station and a destination station. The transportation agency applies a flat fare scheme for traveling on the vehicle along the first route. In such a case, each commuter, who travels on the vehicle, has to pay a fixed fare (such as, USD 5) irrespective of whether each commuter is traveling from the source station to the destination station, the source station to a first sub-station, the first sub-station to a second sub-station, and so on. In another embodiment, the fare may be dependent on at least one or more of, but not limited to, the one or more routes, the distance traveled, or the time of travel in the day. For example, a transportation agency may charge a higher incentive (e.g., USD 15) during an office time (8:00 AM to 10:00 AM and 5:00 PM to 7:00 PM) and may charge a lesser incentive (e.g., USD 7) during remaining time of a day.

In another embodiment, the processor 202 may be configured to calculate the fare for the each pair of stations along the one or more routes based on at least the distance between each pair of stations and the time of the day. For example, a transportation agency charges USD 2 per unit of distance traveled till 11:00 AM and USD 3 per unit of distance traveled after 11:00 AM for travel along a route. In such a case, the processor 202 may calculate the fare of each commuter based on the distance traveled by each commuter. For example, a commuter travels for five kilometer and the travel time is before 11:00 AM. Therefore, the fare charged will be USD 10.

After determining the traffic congestion and the fare between each pair of stations along the one or more routes, the processor 202 may be configured to select the set of routes. In an embodiment, the processor 202 may select each of the set of routes based on at least one or more of, but not limited to, the count of the one or more demands along the one or more routes, the one or more time instances associated with the one or more demands along the one or more routes, the traffic congestion on each of the one or more routes at each of the one or more time instances of the day, and the expected revenue that may be earned when the one or more vehicles are operated along the set of routes to meet the one or more demands. For example, consider there are three routes (e.g., a first route, a second route, and a third route). The application server 108 determines that one or more demands associated with the first route, the second route, and the third route are 40, 45, and 35, respectively, at a time instance 11 AM. Further, the application server 108 determines that there is heavy traffic congestion on the second route and a vehicle on this route will take at least two hours to meet the one or more demands. However, there is light traffic congestion (in comparison to the second route) on the first route and the third route and a vehicle on each of the first route and the third route will take at most one hour to meet the one or more demands. The application server 108 further determines that expected revenue that may be earned when a vehicle is operated along each of the first route, the second route, and the third route is USD 280, USD 270, and USD 290. In such a case, the application server 108 may select the first route and the third route as a set of routes at the time instance 11:00 AM. After selecting the set of routes from the one or more routes, the processor 202 may be configured to determine the set of constraints.

A person having ordinary skills in the art will appreciate that the scope of the disclosure is not limited to above mentioned scenario to select the set of routes. In an embodiment, the set of routes may be selected based on one or more predefined rules that enable the processor 202 to check each of the one or more constraints associated with the one or more routes and accordingly select the routes that are more profitable and that serve maximum demands.

At step 306, the set of constraints is determined. The set of constraints may correspond to one or more constraints associated the transportation agency, which may be utilized to determine the scheduling of the first vehicles while meeting a target performance metric associated with the transportation agency. In an embodiment, the processor 202 may be configured to determine the set of constraints associated with the transportation agency. Prior to determining the set of constraints, the processor 202 may extract the information associated with the one or more vehicles from the database server 106. The information associated with the one or more vehicles may comprise one or more of, but are not limited to, the count of total vehicles, the count of second vehicles, and the capacity of each first vehicle. In an embodiment, the second vehicles correspond to vehicles, which are currently operating along the one or more routes. In an embodiment, the first vehicles correspond to vehicles, which are not operating currently but may operate in future as per schedule. The processor 202 may further determine the tolerance time of each commuter and the fare charged to each commuter as discussed above in steps 302 and step 304. Thereafter, the processor 202 may determine the set of constraints.

The set of constraints may comprise determining whether the count of second vehicles, plying on the one or more routes at a time instance, is less than the count of total vehicles. In such a case, the processor 202 may utilize the comparator 208 to compare the count of second vehicles with the count of total vehicles possessed by the transportation agency. In case the count of second vehicles is equal to the count of total vehicles, the processor 202 may not process any further steps and a corresponding message (e.g., "Scheduling of Vehicles is not possible") may be displayed to the user of the transport manager-computing device 102. However, in case the count of second vehicles is less than the count of total vehicles, the processor 202 may determine the count of first vehicles. For example, a count of total vehicles possessed by a transportation agency is 50. Out of 50 vehicles, 35 vehicles are currently operating on various routes. Therefore, the count of second vehicles is 35. The count of first vehicles corresponds to a difference between the count of total vehicles and the count of second vehicles. Therefore, the count of first vehicles is 15.

After determining the count of first vehicles, the processor 202 may determine whether the capacity of each first vehicle is at least less than the count of the one or more demands. Further, the processor 202 may determine whether the performance metric of the transportation agency meets the set of predefined threshold values (i.e., the target performance metric). The performance metric may be indicative of at least one or more of, but not limited to, an expected revenue, a passenger kilometer index (PKI), a revenue kilometer index (RKI), and a total profit. In an embodiment, the PKI may correspond to a number of commuters served per unit of distance traveled. For example, a transportation agency has a fixed rate scheme for charging commuters, who travel on the vehicles possessed by the transportation agency. Consider the fixed rate as USD 2 per unit of distance traveled. Now consider 80 commuters boarded a vehicle and travel up to 40 units of distance. In such a case, the PKI corresponds to two. Thus, an expected revenue corresponds to USD 6400 (80*40*2). In an embodiment, the RKI may correspond to total revenue earned per kilometer traveled.

At step 308, a check is performed to determine if the one or more demands are determined based on at least the historical demands or the real-time demands. If at step 308, it is determined that the one or more demands are based on at least the historical demands, then step 310 is performed. If at step 308, it is determined that the one or more demands are based on at least the real-time demands, then step 312 is performed. In an embodiment, if at step 308, it is determined that the one or more demands are based on at least the pre-book demands, step 310 is performed.

At step 310, the ILP technique is utilized to determine the count of first vehicles, which may be scheduled along each of the set of routes at the one or more time instances. In an embodiment, the processor 202 may utilize the ILP technique to determine the count of first vehicles. In an embodiment, the processor 202 may utilize the ILP technique, when the one or more demands are determined based on at least the historical demand or the pre-book demands. In an embodiment, the pre-book demands may correspond to the demands, which may have been booked before the first predefined time period such as, but not limited to, 10 days, 8 days, 5 days, 2 days, 1 day, and 20 hours. In an embodiment, the processor 202 may formulate the ILP to determine the count of first vehicles at the one or more time instances, such that the performance metric is maximized. In an embodiment, the maximization of the performance metric may correspond to maximizing at least the expected revenue while ensuring feasibility of operations and thereby meeting a predefined RKI value. In an embodiment, the processor 202 may formulate an ILP problem using the following conditions:

$$\text{Maximize } \sum_{d \in \mathcal{D}} x_d * r_d \quad (1)$$

such that $$Z_{s,k,t} = \sum_{b \in \mathcal{B}|s \in p(b) \cap t=t_b+tdist(p(b)) \cap t(s,b,t)=k} \cdot y_b, \forall s \in S, k \in R(s), t \in \mathcal{T} \quad (2)$$

and $$Z_t \sum_{b \in \mathcal{B}|t_b \le t < t_b+tdist(p(b))} y_b \forall t \in \mathcal{T} \quad (3)$$

and $$Z_t \le m \forall \mathcal{T} \quad (4)$$

and $$\sum_{d \in \mathcal{D}|s \in p(d) \cap t=t_b+tdist(p(d)) \cap t(s,d,t)=k} x_d \le c * Z_{s,k,t} \forall s \in S, k \in R(s), t \in \mathcal{T} \quad (5)$$

and $$\sum_{d \in \mathcal{D}} x_d * r_d \ge (RKI*) \sum \sum_{b \in \mathcal{B}} y_b * \text{dist}(p(b)) \quad (6)$$

where, $\mathcal{D}$: A set of demands comprising the one or more demands;

d: A demand in the set of demands, such that the demand is characterized by a vector $d:(s_d, e_d, t_d, n_d)$, where $s_d$ represents a source station of the demand, $e_d$ represents a destination station of the demand, $t_d$ represents a time instance of origin of the demand, and $n_d$ represents a count of commuters;

$\mathcal{B}$: A possible set of routes and schedules;

b: A route and schedule, such that the route and schedule is characterized by a vector $b:(s_b,e_b,t_b)$, where $s_b$ represents a source station of the route, $e_b$ represents a destination station of the route, and $t_b$ represents a time instance at which a vehicle is scheduled to start from $s_b$;

c: A capacity of a vehicle;

m: A count of total vehicles possessed by a transportation agency;

$x_d$: Number of demands of type d that can be feasibly satisfied;

$r_d$: A fare for a route associated with a demand of type d;

$p(b)=p(s_b,e_b)$: Route of a vehicle with a source station as $s_b$ and a destination station as $e_b$;

distp(b): Distance traveled by a vehicle on a route;

tdist(p(b)): Time taken to travel on a route p(b);

R(s): Set of paths to and from a station s; and $\mathcal{T}$: Set of time periods in a day.

As shown above, the ILP problem is represented in equation 1, while the set of constraints to the ILP problem are represented in equations 2-6. In an embodiment, an aim of the ILP problem (equation 1) is to maximize the expected revenue. Equation 2 defines a variable $Z_{s,k,t}$, which is a latent variable, that denotes the count of second vehicles at a time instance t, at a station s, that will continue on a $k^{th}$ path going out of s. In an embodiment, it may be assumed that there exists a pre-processed list of paths going out of any station, in which the paths are uniquely numbered. Further, the processor 202 may utilize a predefined function i(s,b,t), which returns −1 if a vehicle route b does not pass through the station s at the time instance t, otherwise, returns a unique number of the path that a second vehicle continues on from the station s. The equation 3 defines a variable $Z_t$, which is another latent variable that denotes the count of second vehicles at the time instance t. The equation 4 represents that the count of second vehicles at any time instance is at most the count of total vehicles. The equation 5 represents that the one or more demands that may be served by one or more second vehicles at the station s at the time instance t and continuing on the path k, is limited by the capacity of the one or more second vehicles at the station s at the time instance t. The equation 6 ensures that the performance metric such as the RKI is met. In an embodiment, the RKI may correspond to a ratio of a total revenue that may be earned to a total distance traveled. In an embodiment, the processor 202 may schedule at least one first vehicle along any route to meet the one or more demands if an expected RKI is greater than the predefined RKI value. In an embodiment, the a count of possible routes in the set of routes using the above ILP formulation is $O(n^2 \cdot |T|)$, where n corresponds to a number of stations, and |T| corresponds to a number of time slots in which a total time of operation of the one or more vehicles in the day is divided into.

In another embodiment, the processor 202 may formulate another ILP to determine the count of first vehicles such that the one or more demands are maximized so as to maximize customer satisfaction. In an embodiment, the processor 202 may formulate such an ILP problem using the following conditions:

$$\text{Maximize } \Sigma_{d \in \mathcal{D}} x_d \qquad (7)$$

such that $$Z_{s,k,t} = \Sigma_{b \in \mathcal{B}|t_b \leq t < t_b + tdist(p(b))} y_b, \forall s \in S, k \in R(s), t \in \mathcal{T} \qquad (8)$$

and $$Z_t = \Sigma_{b \in \mathcal{B}|t_b \leq t < t_b + tdist(p(b))} y_b, \forall t \in \mathcal{T} \qquad (9)$$

and $$Z_t \leq m \forall \mathcal{T} \qquad (10)$$

and $$\Sigma_{d \in \mathcal{D}|sep(d) \cap t = t_b + tdist(p(d)) \cap i(s,d,t) = k} x_d \leq c^* Z_{s,k,t}, \forall s \in S, k \in R(s), t \in \mathcal{T} \qquad (11)$$

and $$\Sigma_{d \in \mathcal{D}} x_d * r_d \geq (RKI^*) \Sigma_{b \in} \Sigma_{b \in \mathcal{B}} y_b * dist(p(b)) \qquad (12)$$

In an embodiment, the processor 202 may determine a solution for the ILP problems specified by equation 1 and equation 7, subject to the constraints of equations 2-6 and 8-12, respectively, using any ILP solving technique known in the art. The solution to the ILP problem may be deterministic of the count of first vehicles that may be scheduled along the set of routes at each of the one or more time instances such that the expected revenue may be maximized.

At step 312, the Greedy algorithm is utilized to determine the count of first vehicles, which may be scheduled along each of the set of routes at the one or more time instances. In an embodiment, the processor 202 may utilize the Greedy algorithm to determine the count of first vehicles. In an embodiment, the processor 202 may utilize the Greedy algorithm, when the one or more demands have been determined based on at least the real-time demands. Prior to utilizing the Greedy algorithm, the processor 202 may classify the one or more demands at each time instance into one or more zones such that each zone includes a single pick-up/drop-off point. The zonal pickup or drop-off points may correspond to the one or more stations. In an embodiment, the processor 202 may classify demands, from the one or more demands, into a zone if the demands are within a predefined radius of the zonal pick-up point. For example, there are two zones (e.g., a first zone and a second zone). A source station may be associated with the first zone, when the source station is within a radius of 5 km of the first zone. A destination station may be associated with the second zone, when the destination station is within a radius of 6 km of the second zone. Now, a first demand is received from a first commuter. The first commuter wants to travel from a first source to a first destination. The first source is 4 km from the first zone and the first destination is 5 km from the second zone. In such a case, the first source may be associated with the first zone and the first destination may be associated with the second zone.

Thereafter, the processor 202 may check the count of first vehicles at each of the one or more time instances. In case the count of first vehicles at a time instance is zero, the processor 202 may wait for a next time instance. In an embodiment, the processor 202 may determine the set of routes, as discussed above in step 304, at each of the one or more time instances, when the count of first vehicles at each of the one or more time instances is non-zero. Each of the set of routes may comprise at least one pair of stations, such that there is unique path between the pair of stations. For each path, the processor 202 may be configured to determine the one or more demands. The one or more demands (determined based on the real-time demands) at each time instance may further include one or more previous demands, which may not have expired yet. In an embodiment, each of the one or more demands may be associated with the tolerance time. The tolerance time may indicate the time duration up to which each commuter may further wait for the first vehicle, when the requested time may have expired. For example, a first commuter has requested for a vehicle at a time $t_r$ for a travel from a first station to a second station along a first route. A tolerance time associated with the travel request is $t_d$. In such a case, the first commuter may wait for the vehicle till $t_r+t_d$. Thus, the travel request may be served at any time between $t_r$ and $t_r+t_d$, but not before $t_r$ or after $t_r+t_d$. Further, in an embodiment, the processor 202 may be configured to determine the expected revenue that may be earned, when the first vehicle may be scheduled to travel between one pair of stations (i.e., a path) along the route. In an embodiment, the processor 202 may utilize a standard dynamic programming based weighted interval scheduling algorithm to determine the expected revenue, which may be generated by operating the vehicle along the path. In case the route includes more than one path, the processor 202 may determine the expected revenue of each path. Thereafter, the processor 202 may determine the expected revenue of the route based on at least the expected revenue of each path in the route. For example, a route includes three pairs of stations. The expected revenue associated with each of the three pair of stations is USD 150, USD 200, and USD 175. Therefore, the expected revenue of the route is USD 525 (150+200+175). Further, in an embodiment, the processor 202 may utilize the Greedy algorithm to determine the count of first vehicles, which may be schedule at the one or more time instances along each of the set of routes. The Greedy algorithm may utilize one or more of the set of constraints, the one or more demands at the one or more time instances along the one or more routes, and the expected revenue associated with each route to determine the count of the first vehicles.

At step 314, the information is transmitted to the vehicle-computing device 110 associated with each first vehicle. The information is indicative of at least the scheduled plying of each first vehicle at a time instance along a route. In an embodiment, the processor 202 may transmit the information to the vehicle-computing device 110 associated with each first vehicle. In another embodiment, the user of transport manager-computing device 102 may transmit the information pertaining to the scheduling of each of the first vehicles to the vehicle-computing device 110 of each of the first vehicles.

Figure 4A:
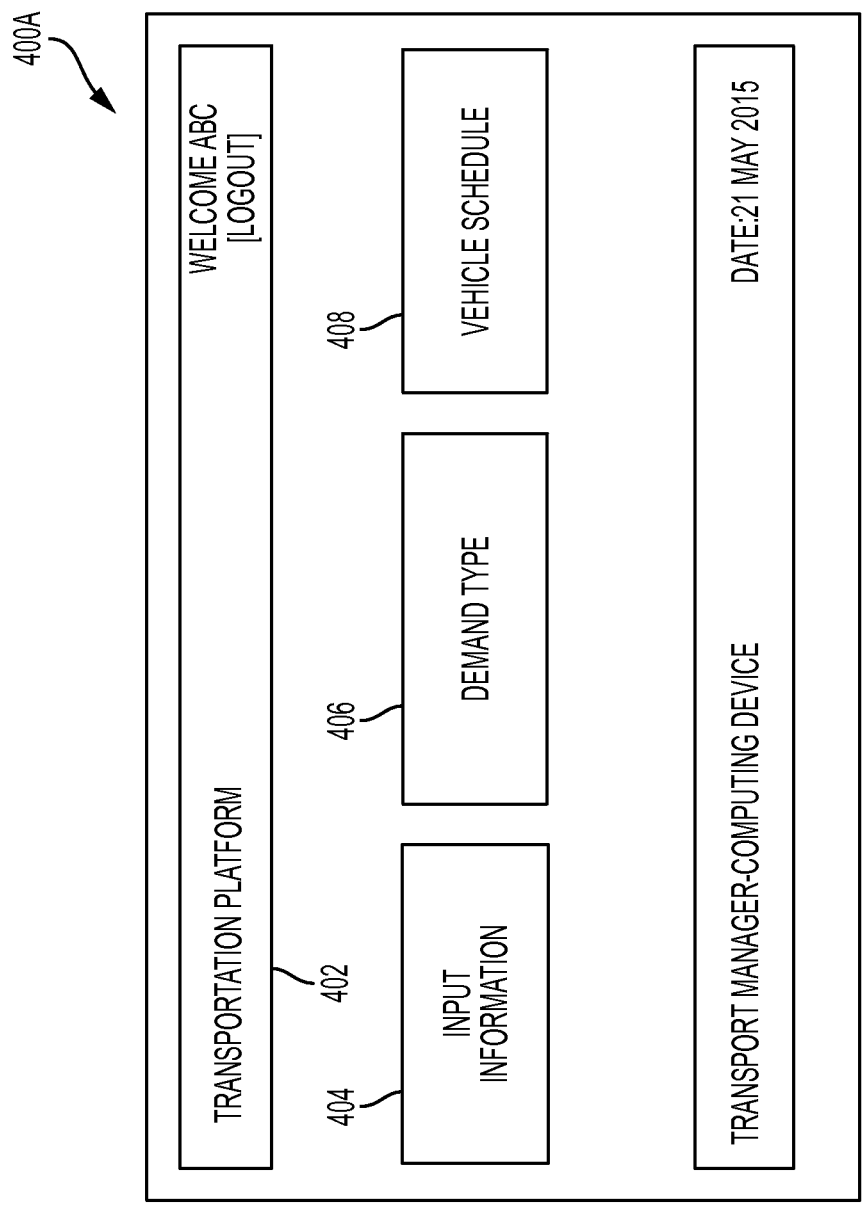
FIG. 4A is a block diagram illustrating an example graphical user-interface that may be utilized by a user on a transport manager-computing device to provide input pertaining to scheduling of first vehicles, in accordance with at least one embodiment.

FIG. 4A is a block diagram illustrating an example GUI 400A that may be utilized by the user of the transport manager-computing device 102 to provide the inputs pertaining to scheduling of the first vehicles, in accordance with at least one embodiment. The GUI 400A may be displayed on a display screen of a computing device such as the transport manager-computing device 102. The user may log into a transportation platform 402 using his/her user id and password. The processor 202 may present the GUI 400A on the transport manager-computing device 102, when the user may have logged in. The user may click on a tab such as an information tab 404 to provide the information pertaining to the one or more vehicles and/or the fare scheme that may be utilized to charge the one or more commuters. Further, the user may click on a tab such as a demand type tab 406 to input the type of demand based on which the one or more demands may be determined. For example, the demand type may be the historical demands, the pre-book demands, or the real-time demands. Thereafter, the user may click on a tab, such as a vehicle schedule tab 408 to start the process of scheduling the first vehicles along each of the set of routes at the one or more time instances.

Figure 4B:
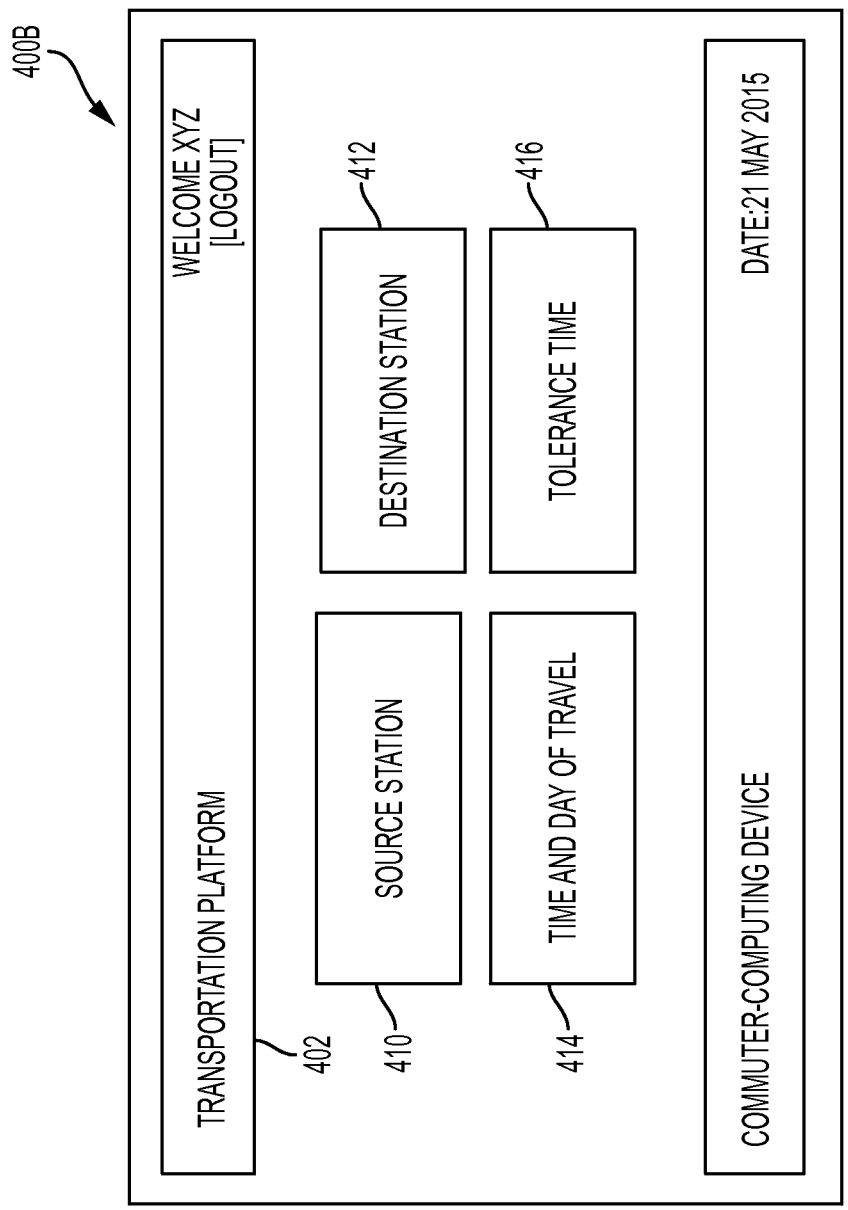
FIG. 4B is a block diagram illustrating an example graphical user-interface that may be utilized by a commuter on a commuter-computing device to submit a travel request, in accordance with at least one embodiment.

FIG. 4B is a block diagram illustrating an example graphical user-interface (GUI) 400B that may be utilized by the commuter of the commuter-computing device 104 to submit a travel request, in accordance with at least one embodiment. The GUI 400B may be displayed on a display screen of a computing device such as the commuter-computing device 104. The commuter may log into the transportation platform 402 using his/her user id and password. The processor 202 may present the GUI 400B on the commuter-computing device 104, when the commuter may have logged in. The commuter may click on a tab, such as a source station tab 410, to input the source station. Further, the user may click on a tab such as a destination station tab 412 to input the destination station. Thereafter, the commuter may click on a tab such as a time and day of travel tab 414 to input the time and the day of travel. Further, the commuter may utilize a tab such as a tolerance time tab 416 to input the tolerance time associated with his/her travel request. Thereafter, the commuter may submit the travel request. After submitting the travel request, the commuter may receive a notification message indicative of either the confirmation or the rejection of the travel request.

Figure 4C:
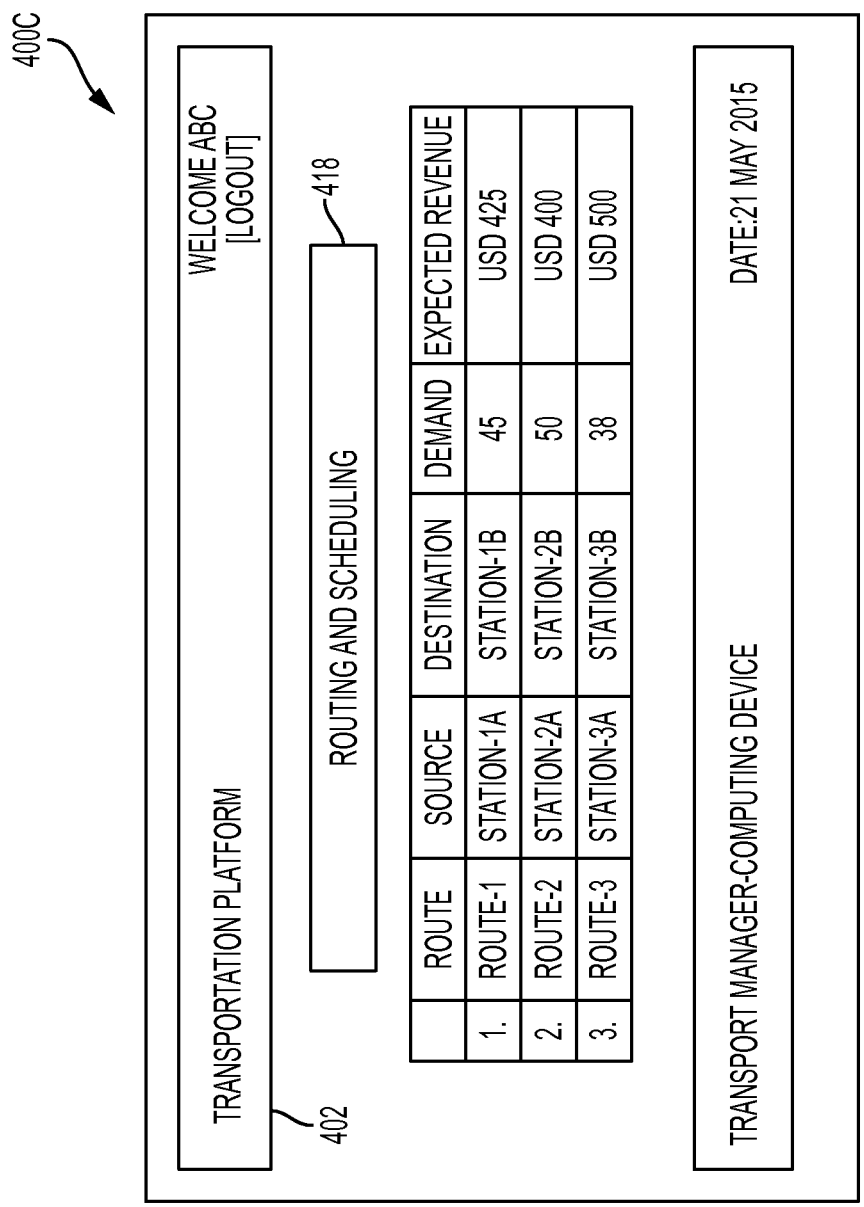
FIG. 4C is a block diagram illustrating an example graphical user-interface that may be presented on a transport manager-computing device to display a schedule of first vehicles along a set of routes, in accordance with at least one embodiment.

FIG. 4C is a block diagram illustrating an example GUI 400C that may be presented on the transport manager-computing device 102 to display the schedule of the first vehicles along the set of routes, in accordance with at least one embodiment. After determining the schedule of the first vehicles, the processor 202 may present the GUI 400C displaying the routing and scheduling of the first vehicles. The GUI 400C may display a source station, a destination station, a demand, and an expected revenue for each of the set of routes. The user may click on a serial number associated with each of the set of routes to view the details of each of the set of routes.

Figure 4D:
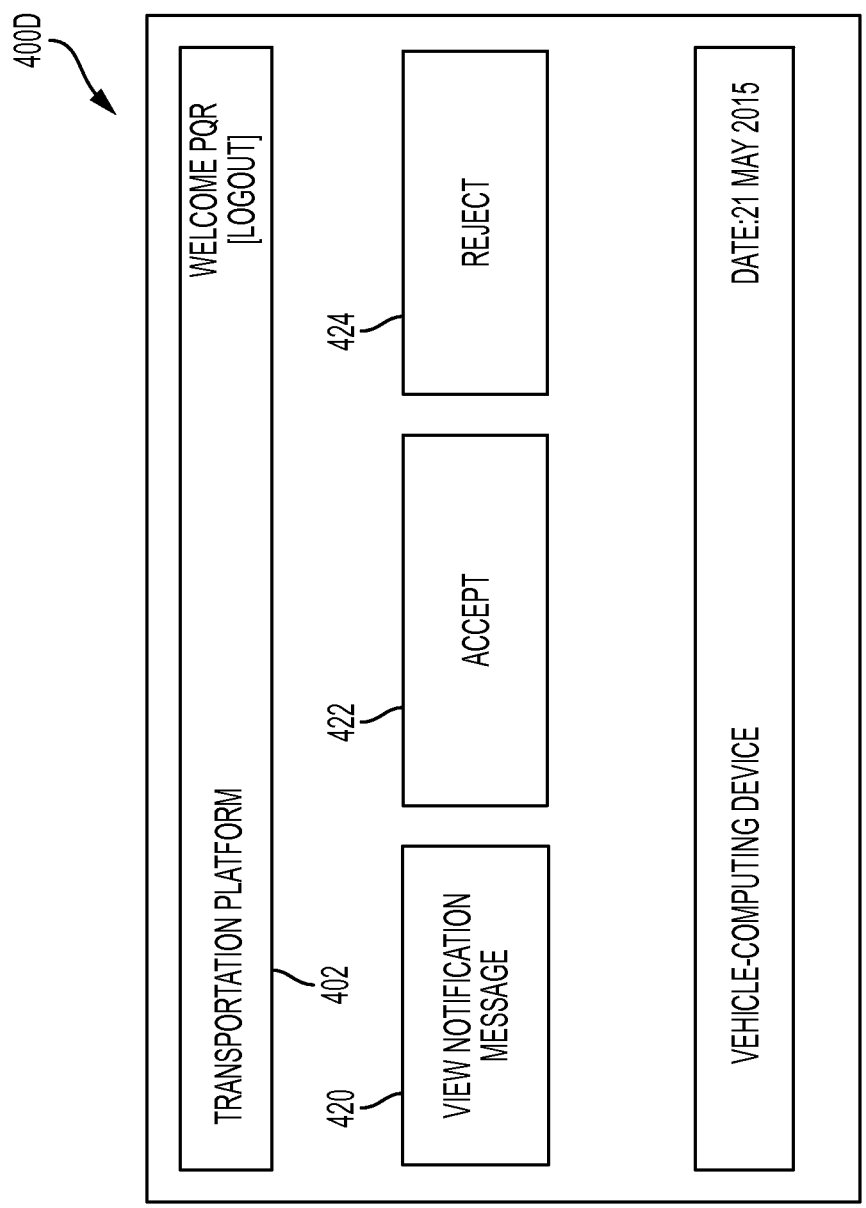
FIG. 4D is a block diagram illustrating an example graphical user-interface that may be presented on a vehicle-computing device to display a schedule of a first vehicle, in accordance with at least one embodiment.

FIG. 4D is a block diagram illustrating an example GUI 400D that may be presented on the vehicle-computing device 110 associated with each of the first vehicles to display the schedule of each of the first vehicles, in accordance with at least one embodiment. The GUI 400D may be displayed on a display screen of a computing device such as the vehicle-computing device 110. The one or more crews associated with the vehicle-computing device 110 may log into the transportation platform 402 using his/her user ID and password. The processor 202 may present the GUI 400D on the vehicle-computing device 110, when the one or more crews may have logged in. the one or more crews may click on a tab such as a view notification message tab 420 to view the notification message. The notification message may be indicative of at least the schedule of each of the first vehicles. Thereafter, the one or more crews may click on a tab such as an accept tab 422 or a reject tab 424 to either accept or reject the schedule.

The disclosed embodiments encompass numerous advantages. The disclosure provides for a scheduling one or more first vehicles along a set of routes in a transportation system. The transportation system may correspond to a public transportation system, a freight logistic system, a commercial shared ride services system, and a private transportation system. The disclosed methods and systems utilize at least one or more demands along one or more routes and an expected revenue associated with each route to determine a set of routes from the one or more routes, such that the one or more first vehicles may be scheduled along the set of routes. A count of the one or more first vehicles at each time instance may be determined based at least one or more constraints associated the transportation system and the one or more demands associated with the set of routes. The disclosed method and the system utilizes the ILP based algorithm or the Greedy algorithm for routing and scheduling in the transportation system. The Greedy algorithm is much faster than the ILP-based algorithm. Therefore, the disclosed method and the system prefer the Greedy algorithm for routing and scheduling, when the one or more demands are based on at least the real-time demands. However, the disclosed method and the system prefers the ILP-based algorithm for routing and scheduling, when the one or more demands are based on at least the historical demands.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for scheduling one or more first vehicles along a set of routes in a transportation system have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for scheduling one or more first vehicles along a route in a transportation system, the method comprising:
   determining, by one or more processors, one or more demands pertaining to a commutation along the route, wherein the route comprises at least one pair of stations such that there is a unique path between the pair of stations;

determining, by the one or more processors, a set of constraints associated with the transportation system, wherein determining the set of constraints comprises at least:

determining, at a comparator of the one or more processors, whether a count of second vehicles, plying on one or more routes in the transportation system at a time instance, is less than a count of total vehicles, determining whether a capacity of a first vehicle is at least less than a count of the one or more demands; and determining whether a performance metric of the transportation system meets a predefined threshold, wherein the predefined threshold is a target performance metric for at least one of an expected revenue, a passenger index, a revenue index, and a total profit; and determining, by the one or more processors, a count of first vehicles, for plying along the route at the time instance, based on at least the set of constraints.

2. The method of claim 1, wherein the transportation system corresponds to at least one or more of a public transportation system, a freight logistic system, a commercial shared ride services system, and a private transportation system.

3. The method of claim 1, further comprising:

selecting, by the one or more processors, the route, from one or more routes, based on at least one or more of a time of day, a traffic congestion on the one or more routes, the count of the one or more demands in the one or more routes, and an expected revenue from each of the one or more routes.

4. The method of claim 1, wherein the pair of stations comprises at least a source station and a destination station.

5. The method of claim 1, wherein the one or more demands are determined, by the one or more processors, based on at least a historical demand, a real time demand, or a pre-book demand.

6. The method of claim 5, wherein the one or more demands are indicative of the commutation by one or more commuters between the pair of stations in the route.

7. The method of claim 1, wherein the set of constraints further comprises determining, by the one or more processors, a tolerance time of a commuter associated with a demand, wherein the tolerance time is indicative of a time duration up to which the commuter waits for the first vehicle on a station along the route.

8. The method of claim 1, wherein the performance metric comprises at least one of a passenger kilometer index (PKI) and a revenue kilometer index (RKI).

9. The method of claim 8, wherein the performance metric is determined based on at least one or more of a fare charged to each commuter for traveling between the pair of stations along the route, a cost incurred by the transportation system for the plying of the first vehicle along the route, and a cost of one or more crews associated with the first vehicle.

10. The method of claim 9, wherein the fare is either a flat rate or is dependent upon the route and a time of travel in a day.

11. The method of claim 1, wherein the count of first vehicles is determined, by the one or more processors, by applying an Integer Linear Programming (ILP) technique on at least the set of constraints.

12. The method of claim 11, further comprising:

determining, by the one or more processors, the count of first vehicles by utilizing a Greedy algorithm, when the one or more demands comprise at least a real time demand.

13. The method of claim 1, further comprising:

transmitting, by the one or more processors, information to a computing device in the first vehicle, wherein the information is indicative of at least the plying of the first vehicle along the route at the time instance.

14. A system for scheduling one or more first vehicles along a route in a transportation system, the system comprising:

one or more processors configured to:

determine one or more demands pertaining to a commutation along the route, wherein the route comprises at least one pair of stations such that there is a unique path between the pair of stations;

determine a set of constraints associated with the transportation system, wherein the determination of the set of constraints comprises at least:

a determination of whether a count of second vehicles, plying on one or more routes in the transportation system at a time instance, is less than a count of total vehicles, a determination of whether a capacity of a first vehicle is at least less than a count of the one or more demands, a determination of a tolerance time of a commuter associated with the one or more demands, the tolerance time being a time duration threshold up to which threshold a commuter will wait for the one or more first vehicles at a station along the route, and a determination of whether a performance metric of the transportation system meets a predefined threshold; and determine a count of first vehicles, for plying along the route at the time instance, based on at least the set of constraints.

15. The system of claim 14, wherein the one or more processors are further configured to:

select the route, from one or more routes, based on at least one or more of a time of a day, a traffic congestion on the one or more routes, the count of the one or more demands in the one or more routes, and an expected revenue from each of the one or more routes.

16. The system of claim 14, wherein the one or more processors are further configured to determine the one or more demands based on at least a historical demand, a real time demand, or a pre-book demand.

17. The system of claim 14, wherein the one or more processors are further configured to:

determine the performance metric based on at least one or more of a fare charged to each commuter for traveling between the pair of stations along the route, a cost incurred by the transportation system for the plying of the first vehicle along the route, and a cost of one or more crews associated with the first vehicle.

18. The system of claim 14, wherein the one or more processors are further configured to:

determine the count of first vehicles by applying at least an Integer Linear Programming (ILP) technique or a Greedy algorithm on at least the set of constraints.

19. The system of claim 14, wherein the one or more processors are further configured to:

transmit information to a computing device in the first vehicle, wherein the information is indicative of at least the plying of the first vehicle along the route at the time instance.

20. A computer program product for use with a computer, the computer program product comprising a non-transitory computer readable medium, wherein the non-transitory computer readable medium stores a computer program code for scheduling one or more first vehicles along a route in a transportation system, wherein the computer program code is executable by one or more processors to:

determine one or more demands pertaining to a commutation along the route, wherein the route comprises at least one pair of stations such that there is a unique path between the pair of stations;

determine a set of constraints associated with the transportation system, wherein the determination of the set of constraints comprises at least:

a determination of whether a count of second vehicles, plying on one or more routes in the transportation system at a time instance, is less than a count of total vehicles, a determination of whether a capacity of a first vehicle is at least less than a count of the one or more demands, and a determination of whether a performance metric of the transportation system meets a predefined threshold, wherein the predefined threshold is a target performance metric for at least one of a passenger index and a revenue index;

determine a count of first vehicles, for plying along the route at the time instance, based on at least the set of constraints; and transmit information to a computing device in the first vehicle, wherein the information is indicative of at least the plying of the first vehicle along the route at the time instance.

* * * * *